United States Patent
Taylor

(10) Patent No.: US 9,450,674 B2
(45) Date of Patent: Sep. 20, 2016

(54) APPARATUS AND METHOD OF COMPENSATING FOR COMPACT DIGITAL DOMAIN CHROMATIC DISPERSION

(71) Applicant: HUAWEI TECHNOLOGIES CO., LTD., Shenzhen, Guangdong (CN)

(72) Inventor: Michael George Taylor, Laurel, MD (US)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 29 days.

(21) Appl. No.: 14/449,484

(22) Filed: Aug. 1, 2014

(65) Prior Publication Data

US 2014/0341592 A1   Nov. 20, 2014

Related U.S. Application Data

(63) Continuation of application No. 12/248,821, filed on Oct. 9, 2008, now abandoned.

(60) Provisional application No. 60/998,184, filed on Oct. 9, 2007, provisional application No. 61/015,508, filed on Dec. 20, 2007.

(51) Int. Cl.
   *H04B 10/69*   (2013.01)
   *H04B 10/2513*   (2013.01)

(52) U.S. Cl.
   CPC .... *H04B 10/2513* (2013.01); *H04B 10/25133* (2013.01); *H04B 10/6972* (2013.01)

(58) Field of Classification Search
   CPC ..................... H04B 10/6161; H04B 10/6971
   See application file for complete search history.

(56) References Cited

U.S. PATENT DOCUMENTS

| | | | |
|---|---|---|---|
| 7,023,601 B2 | 4/2006 | McGhan et al. | |
| 2002/0167924 A1* | 11/2002 | Agrawal | H04B 1/7117 370/335 |
| 2004/0042557 A1 | 3/2004 | Kabel et al. | |
| 2004/0114939 A1 | 6/2004 | Taylor | |
| 2006/0013590 A1* | 1/2006 | Hueda | H04B 10/60 398/149 |
| 2006/0245766 A1 | 11/2006 | Taylor | |
| 2009/0220239 A1 | 9/2009 | Armstrong et al. | |

OTHER PUBLICATIONS

Farbert, A. et al., *Performance of a 10.7 Gb/s Receiver with Digital Equaliser using Maximum Likelihood Sequence Estimation*, ECOC 2004 conference, Stockholm, Sweden, paper Th4.1.5, Sep. 2004 (2 pp.).

Franz, B. et al., *Adaptive Electronic Feed-Forward Equaliser and Decision Feedback for the Mitigation of Chromatic Dispersion and PMD in 43 Gbit/s Optical Transmission Systems*, ECOC 2006 conference, Cannes, France, paper We1.5.1, Sep. 2006 (2 pp.).

(Continued)

*Primary Examiner* — Shi K Li
(74) *Attorney, Agent, or Firm* — Staas & Halsey LLP

(57) ABSTRACT

A method and apparatus of compensating for compact digital domain chromatic dispersion. The distortion of an optical signal due to chromatic dispersion is compensated by a digital signal processing in the electrical domain, either prior to the optical transmitter or following the receiver. The circular coefficient approximation and sub-band processing reduce the amount of computations to execute a given level of chromatic dispersion compensation compared to a direct finite impulse response filter implementation.

8 Claims, 7 Drawing Sheets

(56) References Cited

OTHER PUBLICATIONS

Goldfarb, G. et al., *Chromatic Dispersion Compensation Using Digital IIR Filtering With Coherent Detection,* IEEE Photonics Technology Letters, vol. 19, No. 13, Jul. 1, 2007, pp. 969-971.
Vaidyanathan, P., *Multitrate Digital Filters, Filter Banks, Polyphase Networks, and Applications: A Tutorial,* Proceedings of the IEEE, vol. 78, No. 1, Jan. 1990, pp. 56-93.
Vaidyanathan, P., *Filter Banks in Digital Communication,* IEEE 2001, pp. 1-25.
*Equalizaer (communications),* http://en.wikipedia.org/wiki/Equalizer_(communications), printed Feb. 12, 2012 (2 pp.).
Wikipedia item, *Orthogonal frequency-division multiplexing,* downloaded Jul. 22, 2012, http://en.wikipedia.org/wiki/Orthogonal_frequency-division_multiplexing (12 pp.).
Office Action, dated Feb. 17, 2012, in corresponding U.S. Appl. No. 12/248,821 (7 pp.).
Final Office Action, dated Aug. 6, 2012, in corresponding U.S. Appl. No. 12/248,821 (8 pp.).
Office Action, dated May 1, 2014, in corresponding U.S. Appl. No. 12/248,821 (8 pp.).
U.S. Appl. No. 12/248,821, filed Oct. 9, 2008, Taylor, Huawei Technologies Co., Ltd. of Shenzhen, P.R. China.
U.S. Appl. No. 61/015,508, filed Dec. 20, 2007, Taylor.
U.S. Appl. No. 60/998,184, filed Oct. 9, 2007, Taylor.
U.S. Office Action issued on May 1, 2014 in copending U.S. Appl. No. 12/248,821.
U.S. Office Action issued on Feb. 17, 2012 in copending U.S. Appl. No. 12/248,821.
U.S. Office Action issued on Aug. 6, 2012 in copending U.S. Appl. No. 12/248,821.

"Equalizer (Communications)", Wikipedia, the Free Encyclopedia, "http://en.wikipedia.org/wiki/Equalizer_(communications)", Jan. 5, 2012, pp. 1-2.
P. P. Vaidyanathan, "Filter Bank in Digital Communications", IEEE, 2001, 22 Pages.
P. P. Vaidyanathan, "Multirate Digital Filters, Filter Banks, Polyphase Networks, and Applications: A Tutorial", Proceedings of the IEEE, vol. 78, No. 1, Jan. 1990, pp. 56-93.
B. Franz, et al., "Adaptive Electronic Feed-Forward Equaliser and Decision Feedback Equaliser for the Mitigation of Chromatic Dispersion and PMD in 43 Gbit/s Optical Transmission Systems", ECOC 2006 Conference, Cannes, France, paper We1.5.1, Sep. 2006, 2 Pages.
A. Farbert et al., "Performance of a 10.7 Gb/s Receiver with Digital Equaliser using Maximum Likelihood Sequence Estimation", ECOC 2004 Conference, Stockholm, Sweden, Paper Th4.1.5, Sep. 2004.
G. Goldfarb et al., "Chromatic Dispersion Compensation Using Digital IIR Filtering with Coherent Detection", IEEE Photonics Technology Letters, vol. 19, No. 13, Jul. 1, 2007, pp. 969-971.
"Orthogonal Frequency-Division Multiplexing", Wikipedia, the Free Encyclopedia, "http:/en.wikipedia.org/wiki/Orthogonal_frequency- division_multiplexing", Jul. 11, 2012, 12 Pages.
Govind P. Agrawal, "Nonlinear Fiber Optics and its Applications in Optical Signal Processing" University of Rochester, The Institute of Optics, 2007, pp. 1-44.
Richard G. Lyons, "Understanding Digital Signal Processing", Third Edition, Prentice Hall, 2011, 56 Pages.
Govid P. Agrawal, "Fiber Optic Communication Systems", Third Edition, Wiley Interscience, John Wiley & Sons, 2002, 563 Pages.

\* cited by examiner

APPARATUS AND METHOD OF COMPENSATING FOR COMPACT DIGITAL DOMAIN CHROMATIC DISPERSION

CROSS-REFERENCE TO RELATED APPLICATIONS

This application is a continuation of U.S. patent application Ser. No. 12/248,821, filed on Oct. 9, 2008, which claims the benefit of U.S. Provisional Patent Application Ser. No. 60/998,184 filed Oct. 9, 2007 and Ser. No. 61/015,508 filed Dec. 20, 2007, both by Michael G. Taylor, all of which are hereby incorporated by reference.

FIELD OF THE INVENTION

This invention relates to optical communications. Specifically, and not by way of limitation, the present invention relates an apparatus and method of compensating for compact digital domain chromatic dispersion.

BACKGROUND OF THE INVENTION

Information has been transmitted over optical fibers since the late 1970s. Discussions in this field are disclosed in "Optical Communication Systems" by John Gowar (Prentice Hall, 2nd ed., 1993) and "Fiber-optic communication systems" by Govind P. Agrawal (Wiley, 2nd ed., 1997), which are herein incorporated by reference. The information is usually in the form of binary digital signals, i.e. logical "1"s and "0"s, but fiber optics is also used to transport analog signals. The remainder of this document will refer only to the applications with digital signals. Every transmission system has a transmitter, which emits light modulated with information into the fiber, and a receiver at the far end which detects the light and recovers the information. A typical transmission system might have several spans of optical fiber with erbium doped fiber amplifiers (EDFAs) between spans. The EDFAs amplify the optical signal to overcome the loss of the fiber spans. The total transmission distance through optical fiber experienced by an optical signal may be several thousand kilometers.

The simplest way of imposing information onto the optical carrier at the transmitter is by modulation of the amplitude (or power or intensity) of the light. For binary digital signals this corresponds to on-off modulation. The receiver then comprises a simple photodetector, employing direct detection. The photocurrent generated by the photodetector is a replica of the power falling on the photodetector. Subsequent electronic circuits amplify and process the photocurrent electrical signal to determine the information content of the received optical signal. Alternatively it is possible to modulate information onto the electric field of the optical carrier. There are several advantages to imposing information by modulating the electric field, but it is not yet in widespread use because the receiver is more complex. A simple direct detection receiver cannot be used, because it responds to the power (the absolute value squared of the electric field) and not to the electric field of the optical signal. Thus, any information in the phase of the optical signal is lost. A coherent detection receiver may be used, as this type of receiver does respond to the optical signal's electric field. In a coherent receiver, the incoming optical signal is mixed with continuous wave light from a local oscillator of the same wavelength, and then detected. The photocurrent in the photodetector includes a term which is the beat product of the optical signal and local oscillator, and which depends on the optical signal's electric field. Typically further processing is needed to obtain the electric field from the beat product. U.S. Patent Application 2004/0114939, herein incorporated by reference, discloses a phase diverse coherent receiver configuration using digital signal processing (DSP) to calculate the electric field. Values of the real and imaginary parts (the inphase and quadrature components) of the complex electric field are then available within the digital processor for further processing.

The optical signal may be distorted by propagation through the optical fiber. There are several distinct propagation effects that can occur, as described in "Nonlinear fiber optics" by Govind P. Agrawal (Academic Press, 2nd ed., 1995). Chromatic dispersion (CD) is the propagation effect most often encountered. A 10 Gb/s on-off modulated optical signal is substantially distorted by CD after propagation through about 100 km of non-dispersion shifted fiber (NDSF), so it is necessary to compensate for chromatic dispersion in some way in order to transmit over longer distances than 100 km. The usual way to compensate for CD is via dispersion compensation fiber (DCF), an optical component placed in line with the transmission fiber. DCF has the positive feature that it compensates exactly for chromatic dispersion, but it has disadvantages that it is expensive, it is physically large in size, it has substantial optical loss, and the amount of CD being compensated is fixed. There are ways to compensate for chromatic dispersion in the electronics of the receiver after photodetection. For example, "Adaptive Electronic Feed-Forward Equaliser and Decision Feedback Equaliser for the Mitigation of Chromatic Dispersion and PMD in 43 Gbit/s Optical Transmission Systems" by B. Franz et al. (ECOC 2006 conference, Cannes, France, paper We1.5.1, September 2006) describes an electronic domain CD compensator using analog signal processing, and "Performance of a 10.7 Gb/s Receiver with Digital Equaliser using Maximum Likelihood Sequence Estimation" by A. Farbert et al. (ECOC 2004 conference, Stockholm, Sweden, paper Th4.1.5, September 2004) describes one using digital signal processing. Compensation in the electrical domain is expected to cost less than using optical components because of the nature of mass production of electronics. However electrical compensation of CD following direct detection can only compensate for a small amount of chromatic dispersion, equivalent to perhaps 100 km of NDSF at 10 Gb/s, because direct detection discards the phase of the optical signal. For this reason on long fiber optic transmission systems most of the CD compensation has been done via DCF, with electrical domain compensation simply trimming the amount of compensation.

Recently two new methods of electrical domain CD compensation have been proposed which are able in principle to compensate for unlimited transmission distances. Both methods use digital signal processing and effectively operate on a discrete-time representation of the electric field of the optical signal. The first method precompensates for chromatic dispersion, and is disclosed in U.S. Pat. No. 7,023,601. An optical signal is transmitted which may not resemble the information content, and after propagation through optical fiber the chromatic dispersion of the fiber transforms the optical signal into the desired form, which does resemble the information content. A pair of Mach-Zehnder optical modulators in the transmitter allow the inphase and quadrature parts (the real and imaginary parts) of the electric field to be modulated independently. Each of the two Mach-Zehnder modulators is driven by an electrical signal set by a digital-to-analog (D/A) converter, which in turn, is controlled by a digital signal processor. The DSP calculates the electric field of the precompensated optical signal such that after propagating through the known chromatic dispersion of the fiber optic transmission system the correct optical signal arrives at the receiver. The receiver may be a direct detection receiver, given that the precompensated optical signal is calculated to become an on-off modulated signal after propagation through the optical fiber. Alternatively, the receiver may be of a more advanced design, such as a coherent receiver, and the optical signal arriving at the receiver may then be a phase modulated signal.

The second method of CD compensation that operates on the electric field of the optical signal is with a phase diverse coherent receiver, as described in U.S. Patent Application Number 2004/0114939. A conventional optical signal is transmitted, such as an on-off modulated signal or a phase modulated signal. The optical signal becomes distorted by the chromatic dispersion of the fiber optic transmission system. The coherent receiver uses DSP to calculate the electric field of the incoming optical signal, and these electric field values can then be acted upon to compensate for the effect of the chromatic dispersion.

The present invention is related to the calculation performed within the digital signal processor to compensate for chromatic dispersion. Although the two methods differ in that one precompensates for CD at the transmitter, while the other postcompensates at the receiver, the calculation is very similar. The digital signal processor takes the given electric field, either the undistorted signal in the case of precompensation or the distorted signal in the case of postcompensation, and calculates the impact of an element of chromatic dispersion having the same magnitude and the opposite sign to the actual chromatic dispersion of the fiber optic transmission system. The calculation is typically done by a finite impulse response (FIR) filter, also known as a transversal filter. FIG. 1 illustrates a structure of an FIR filter. It comprises several delay stages 102 and multiply stages 104, and the multiplications results are summed 106. Each delay r corresponds to one sample of the digitized representation, which is typically half a digital symbol period. The FIR filter implements the following equation:

$$y(n) = \sum_{k=0}^{N-1} x(n-k)h(k) \quad (1)$$

where x(n) are the input electric field values, y(n) are the output values, and h(k) are the tap weights. All three variables are complex numbers, and the multiplication appearing on the right hand side is complex multiplication. n is the sample number, incrementing at typically two times per digital symbol, and N refers to the number of filter taps. The FIR filter is implemented as digital logic gates in an integrated circuit, and so it does not follow that the structure of FIG. 1 will appear in the integrated circuit. The tap weight coefficients h(k) may be determined from the inverse Fourier transform of the transfer function of the required amount of chromatic dispersion. For example, FIG. 2 is a graph illustrating the real and imaginary parts of the tap weights to compensate for 2000 km NDSF at a symbol rate of 10 Gbaud. Each point in time in the graph of FIG. 2 corresponds to one tap weight. 140 delay and multiply stages are needed to accurately compensate for chromatic dispersion in this case. In fact, the set of tap weight coefficients associated with chromatic dispersion is always symmetric about the center, so it is possible to use each multiplication result twice. Taking that saving into account, there are still 70 multiplications to be executed for each symbol period. This number is so large, that in practice, most of the computations performed by the digital signal processor are for chromatic dispersion compensation, and the amount of computations are on the edge of what is possible using today's integrated circuit technology. In addition, the power dissipation of the integrated circuit is proportional to the amount of computations, so it is beneficial for that reason to reduce the amount of computations.

The variables x(n), y(n) and h(k) are in general continuous quantities, and they can take on a smooth range of values. To compute equation 1, these variables are approximated by a discrete set of values, which is a finite length binary digital representation. Additionally, the D/A converter used with precompensation, and the A/D converter for the postcompensation case, work on discrete values of a certain number of binary digits. When a small number of binary digits is used to represent a variable, it makes the CD compensation less accurate, but it saves on integrated circuit resources.

While the CD compensation calculation for precompensation is similar to postcompensation, there are important differences between the amounts of computations needed to implement the two of them. With precompensation, the variable x(n) in equation 1 refers to the electric field of the optical signal containing the specified information, and y(n) refers to the desired transmit signal electric field to be sent to the D/A converters. Depending on the modulation format chosen, x(n) takes on only values from a small set. For example, if on-off modulation is used x(n) can take on two possible values from the set {0,1} at the symbol centers. Alternatively with quadrature phase shift keying (QPSK) modulation format x(n) takes on one of four possible values at the symbol centers, {−1,1,−i,i}, where i refers to the imaginary number $\sqrt{-1}$. In both these modulation format examples, any of the allowable values of x(n) is written as a short number in a binary digital representation. This means that the product terms x(n−k) h(k) of equation 1 may be evaluated with a small number of logic gates. In contrast, when postcompensation is implemented in conjunction with coherent detection, the variable x(n) refers to the electric field of the incoming optical signal, and y(n) refers to the signal after chromatic dispersion compensation. x(n) may take on a wide range of values in this case, typically limited by the resolution of the D/A converter. It requires several binary digits to adequately represent x(n), and there is no economy in the number of logic gates to calculate the terms x(n−k) h(k). For this reason, precompensation typically requires fewer computation resources than postcompensation for an equivalent quality of CD compensation. However there are other benefits to using a coherent receiver, and it is desirable to implement CD compensation in a coherent receiver using the same amount of computations or fewer than precompensation.

An alternative to the FIR filter is to use the discrete Fourier transform (DFT) for CD compensation. The DFT is calculated for a block of contiguous sample values, where the size of the block is typically several times larger than the extent of the CD impulse response. The discrete Fourier transform may be calculated using one of the well-established multistage fast Fourier transform algorithms which are described in "Understanding Digital Signal Processing" by Richard G. Lyons (Prentice Hall, 1996), herein incorporated by reference. The fast Fourier transform algorithm calculates the Fourier transform of N points in $\log_2 N$ stages, each stage involving the multiplication and addition of pairs of values. The output values of the DFT (the spectrum of the input) are multiplied by the phase factors associated with the chromatic dispersion transfer function. Then the inverse discrete Fourier transform is calculated by a similar algorithm to the forward DFT, to produce a discrete-time sequence which represents the CD compensated optical signal as a function of time. The DFT may use fewer arithmetic operations compared to the FIR filter. For example, in the case of compensation for 2000 km NDSF at 10 Gbaud with a 512-point DFT window, the number of multiplications per symbol is 44. However, more buffering of data values is needed since the DFT window is larger than the CD impulse response (the FIR filter width), so the reduction in number of multiplications may be offset by the extra latches and communication resources needed in the integrated circuit.

A second alternative way of performing CD compensation to the FIR filter has been proposed and modeled. A solution using an infinite impulse response (IIR) filter design is described in "Chromatic Dispersion Compensation Using Digital IIR Filtering With Coherent Detection" by G. Goldfarb & G. Li (IEEE Phot. Tech. Lett., vol. 19, no. 13, p. 969-971, 2007). It is well known that the transfer function of an FIR filter having many taps may often be implemented more compactly by an IIR filter. Goldfarb & Li obtained a reduction by a factor of 2.5 in the amount of computations compared to the FIR filter. However, the digital signal processor in an actual implementation is likely to be organized in a parallel architecture, and there is a difficulty implementing an IIR filter in a parallel digital processor. The IIR filter inherently uses feedback from previous results, such as y(n−1), to calculate result y(n). In contrast, the FIR filter of equation 1 does not have any terms in y(n−1) on the right hand side. In a parallel architecture digital processor, the result y(n−1) may not be available at the time of calculating y(n), so the IIR algorithm cannot be implemented. This issue is discussed in U.S. Patent Application Number 2006/0245766, herein incorporated by reference. There are ways to resolve the problem, such as recasting the algorithm using a look-ahead computation, but the solution requires more computations. It is possible that the IIR filter for CD compensation described by Goldfarb & Li would reduce the amount of computations by significantly less than the factor of 2.5, if it were implemented in a parallel digital signal processor. It is desirable to find a way to adapt the IIR filter solution so that it can be implemented in a parallel digital signal processor without requiring excess computations.

Thus, there is a need for an algorithm to compensate for chromatic dispersion in a digital signal processor which uses a smaller amount of computations than a direct implementation of an FIR filter. It is preferable that such an algorithm does not require buffering of a larger number of sample values than the FIR filter algorithm. Also there is a need for an IIR filter algorithm that uses a small amount of computations when implemented on a parallel digital signal processor.

SUMMARY OF THE INVENTION

The present invention is a method and apparatus to compensate for chromatic dispersion in a digital signal processor. The present invention improves upon the prior art by using fewer computation resources to achieve the same result. The digital signal processor may be located at the fiber optic transmitter if CD precompensation is used, or at the receiver if postcompensation is used in conjunction with coherent detection.

The present invention reduces the number of computations needed to implement an FIR filter by approximating the actual filter coefficients to a limited set of allowed digitization values lying on a circle on the complex plane. Following this approximation, the same filter coefficients recur many times. A multiplication of a signal value by a certain filter coefficient may be executed in full once, and then reused many times without repeating the multiplication, so as to save on computation resources.

In one aspect, the present invention reduces the amount of computations by dividing the signal into several spectral sub-bands. The sub-bands are separately CD compensated, and then combined into a single output signal. The total amount of computations to compensate for CD on all the sub-bands plus performing the sub-band filtering is less than the amount of computations to compensate for CD directly.

In another aspect, the present invention is a digital signal processor utilized in a fiber optic communication system. The digital signal processor compensates for chromatic dispersion and executes a digital filter function. The digital filter function includes an operation of multiplying a signal value received by the digital signal processor by a coefficient to produce a multiplication result. The multiplication result is used three or more times during the execution of the digital filter function.

In still another aspect, the present invention is a method of compensating for chromatic dispersion experienced by an optical signal propagating through a fiber optic transmission system, said method acting on a discrete-time representation of the optical signal with a digital filter operation. The method includes evaluating a multiplication term to obtain a multiplication result and using the multiplication result as the value of three multiplication terms in the digital filter operation.

BRIEF DESCRIPTION OF THE DRAWINGS

FIG. 8, (b), is a graph illustrating exemplary rounded overlapping sub-band shapes utilized when implementing sub-band processing.

DETAILED DESCRIPTION OF THE EMBODIMENTS

A. Circular Coefficient Approximation

Figure 1:
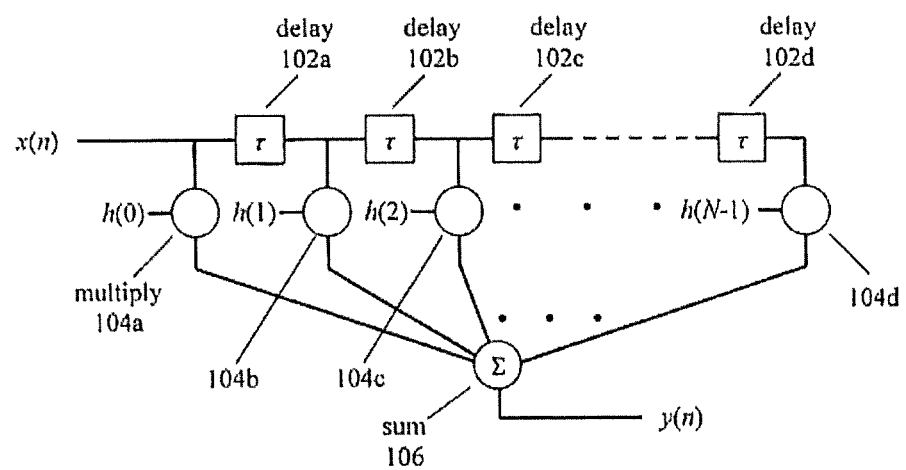
FIG. 1 (prior art) is a simplified block diagram of a finite impulse response filter.
Figure 2:
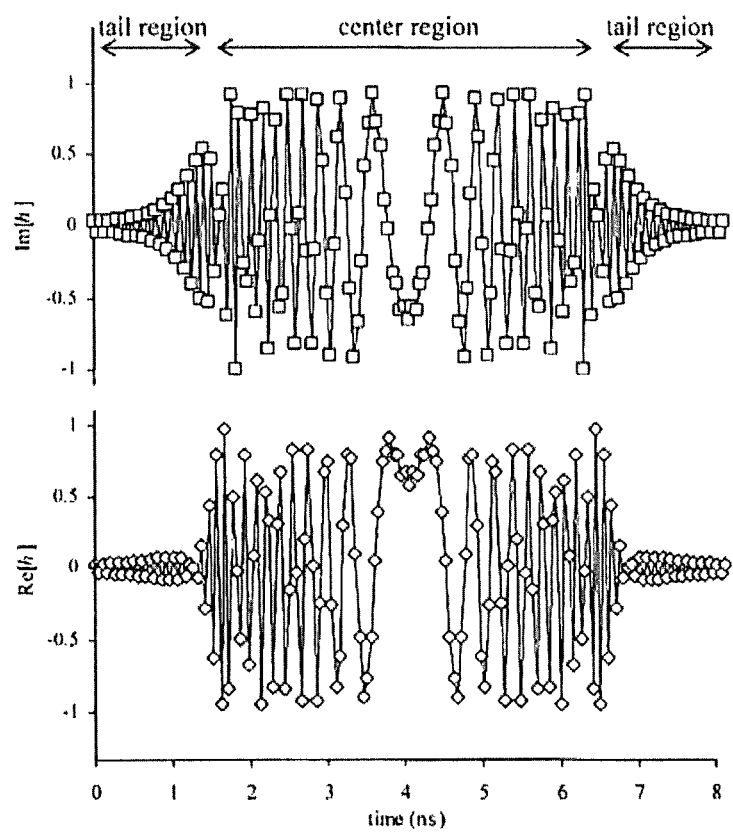
FIG. 2 (prior art) is an exemplary graph of the FIR filter coefficients used to compensate for chromatic dispersion for a system configuration of 2000 km of NDSF at 10 Gbaud.
Figure 3A:
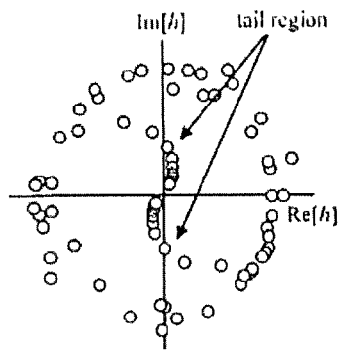
FIG. 3A is a graph illustrates the FIR filter coefficients of FIG. 2 plotted on the complex plane for tap weights only.
Figure 3B:
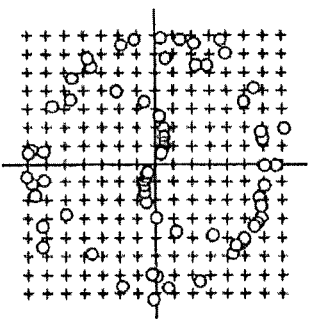
FIG. 3B is a graph illustrating the FIR filter coefficients of FIG. 2 with grids for standard digitization.
Figure 3C:
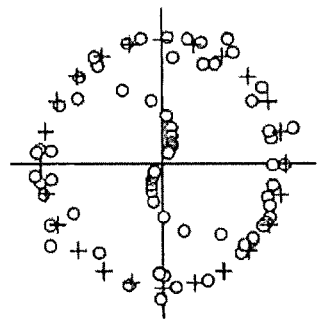
FIG. 3C is a graph illustrating the FIR filter coefficients of FIG. 2 with allowed digitization values assuming digitization using circular coefficient approximation.

FIG. 3A is a plot on the complex plane of the tap weight coefficients of FIG. 2, the example of a 10 Gbaud signal over 2000 km NDSF. Each point is a plot of the imaginary part of the coefficient versus the real part. The key feature of FIG. 3A is that most of the points lie close to a circle on the complex plane. Only the tails of the tap weight coefficients, as marked on FIG. 2 and FIG. 3A, deviate significantly from the circle. This circular nature is common to all sets of tap weight coefficients that are designed to compensate for chromatic dispersion. The standard approach to digitization of the tap weights is to digitize the real and imaginary parts independently, to a certain number of binary digits. This is equivalent to moving each point to the closest of a grid of allowed values. The square crosses in FIG. 3B are the allowed digitized values when the complex parts of the coefficients are digitized to 4 binary digits. This is an inefficient way to represent the coefficients h(k) since most of the grid points are not used. It is better to choose the allowed digitization values to lie on a circle, as shown in FIG. 3C.

Rounding the actual coefficients to the circular tap weight coefficients leads to a reduction in the number of multiplications to implement equation 1. When a new value of x(n) arrives it is multiplied by all the possible allowed values of h(k) (or a subset of these allowed values, as discussed below). The results of the multiplications are stored in a small look-up table. Then to compute the right hand side of equation 1 each multiplication term is drawn from the look-up table. There will be substantial reuse of each multiplication result on average provided that the number of FIR filter taps is larger than the number of entries in the look-up table. The determination of which look-up table entry to read may be made in advance which simplifies the design of the digital signal processor. Only the value to be stored in the look-up table has to be computed in real time. An alternative way to reuse multiplication results is to perform a multiplication and then fan out the result to all the locations in the integrated circuit that will use it. The multiplication result may be used over several clock cycles of the digital signal processor, and one or more buffers may be used to keep it available. This method of reusing multiplication results is equivalent to the look-up table method, but differs in that a result may be buffered in several places instead of one, or it may not be buffered at all if all computations occur in the same processor clock cycle.

This choice of allowed digitization values leads to savings in the amount of computations. Each of the grid points h is defined by its real and imaginary parts, Re[h] and Im[h]. The complex multiplication xh is done by evaluating the two parts of separately $$Re[xh]=Re[x]Re[h]-Im[x]Im[h] \quad (2a)$$

$$Im[xh]=Re[x]Im[h]+Im[x]Re[h] \quad (2b)$$

Thus, it is acceptable to store the four real results given on the right hand sides of equation 2 in the look-up table instead of storing the complex result xh. If the number of allowed digitization points is a multiple of 4, then the values of the four real multiplication results for each allowed h in three quadrants are obtained easily from the values of the fourth quadrant by multiplying by +1 or −1. Multiplication by −1 is quick to evaluate in a binary digital representation. Furthermore, if the number of allowed digitization points is a multiple of 12 then the grid includes points at 30°, 60°, etc. This means that some values of Re[h] and Im[h] are 0.5, and multiplication by 0.5 is quick to evaluate for binary numbers. If the number of allowed digitization points is a multiple of 8, then there are allowed points at 45o to the axes. This means there are further savings in computations because these points have Re[h]=Im[h]. Putting these possibilities together in an example where the number of allowed circle points is 24, as is shown in FIG. 3C, there are only 8 real-real multiplications that have to be performed for each x(n) and stored in the look-up table. All the other complex multiplication results for the 24 allowed digitization values of h may then be generated by trivial calculations.

Referring again to the example of CD compensation for a 10 Gbaud optical signal propagating over 2000 km NDSF, the number of multiplications to implement the FIR filter directly is 70, taking into account the symmetry of the coefficients. Therefore, there are substantial savings in the amount of computations via the circular coefficient approximation if only 8 real-real multiplications are made for each x(n) instead of 70 complex multiplications.

The allowed digitization values of h indicated in FIG. 3C are approximations to the actual values. The approximation will lead to a penalty compared to exact CD compensation. The case of 10 Gbaud QPSK transmission over 2000 km NDSF has been modeled numerically, and is described in "Compact Digital Dispersion Compensation Algorithms" by M. G Taylor (OFC 2008 conference, San Diego, US, paper OTuO1, February 2008), which is herein incorporated by reference. The penalty due to the circular coefficient approximation was found to be approximately 0.83 dB, which is acceptable. It is only 0.32 dB worse than if CD compensation were performed by precompensation using existing algorithms. However, the amount of computations is significantly less than for precompensation.

There are two kinds of error in h generated by applying the circular coefficient approximation. First, the tails of the tap weight coefficients are poorly approximated. Second, in the center region the absolute value of the coefficients is not uniform, while the circular coefficient approximation digitizes them to have a fixed absolute value. These two causes of error in h may be dealt with by the following measures. It would be more accurate to use the conventional digitization mode, the grid of FIG. 3B, for the tails, and use the circular coefficient approximation for the center region of the tap weight coefficients. This does not consume many more computations because the tails are typically a smaller region than the center region. To address the non-uniform magnitude of the center region, it would be more accurate to use a small number of circles of allowed digitization values having different radii, for example two circles. This would increase the size of the look-up table by a factor equal to the number of circles chosen, but could still lead to a significant reduction in the amount of computations.

Figure 4A:
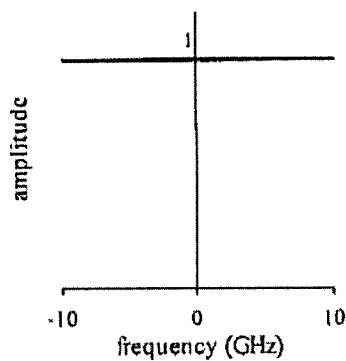
FIG. 4A is a diagram illustrating the frequency response in amplitude associated with the exemplary element of chromatic dispersion.
Figure 4B:
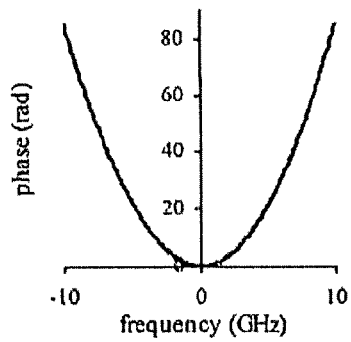
FIG. 4B is a diagram illustrating the frequency response in phase associated with the exemplary element of chromatic dispersion.
Figure 5A:
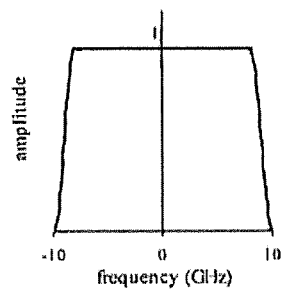
FIG. 5A exemplary graph illustrating the frequency response of an apodized version in amplitude of the chromatic dispersion transfer function.
Figure 5B:
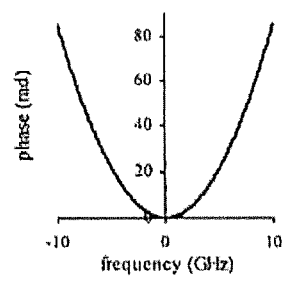
FIG. 5B exemplary graph illustrating the frequency response of an apodized version in phase of the chromatic dispersion transfer function.
Figure 5C:
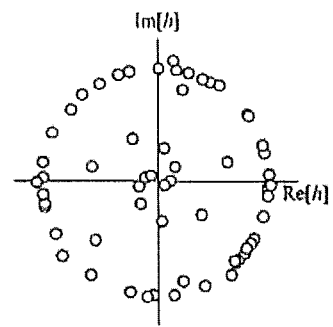
FIG. 5C is an exemplary graph illustrating the frequency response of an apodized version with corresponding impulse response plotted on complex plane.

Another way to deal with the two kinds of error in h is to use an apodized version of the CD frequency response (also known as a windowed FIR filter). The CD impulse response shown in FIG. 2 (real and imaginary parts vs. time) and FIG. 3 (complex plane plot) is calculated from the exact CD frequency response of 2000 km NDSF for a 10 Gbaud optical signal, whose amplitude and phase angle are shown in FIGS. 4A and 4B. The magnitude of the frequency response is flat. FIGS. 5A and 5B show the phase angle and amplitude of an alternative apodized frequency response. The amplitude is a raised cosine function which decays at the edges. The fact that some frequency components are attenuated by this transfer function typically causes only a small penalty in the quality of the received signal because the frequency components are at the edge of the band, where the signal has little or no energy. The impulse response of this apodized transfer function is shown in FIG. 5C, on the complex plane. Comparing FIG. 5C with the original version of FIG. 3, it is clear that the amplitude of the center region is more constant and that the number of points in the tail region is smaller. This means that the errors in impulse response h by applying the circular coefficient approximation calculated from the apodized CD frequency response is smaller than by applying the circular coefficient approximation to the original (non-apodized) frequency response.

A key feature common to all these alternative embodiments of the circular coefficient approximation is that a multiplication result xh is used more than twice. It is well known that a multiplication result may be used twice because of the symmetrical nature of the tap weight coefficients. The circular coefficient approximation advances on the prior art in that it provides a way for a multiplication result to be used more than twice.

B. Sub-Band Processing

An additional way to reduce the amount of computations for chromatic dispersion compensation is to divide the optical spectrum being processed into smaller sub-bands, and process each sub-band separately. This approach may be combined with the circular coefficient approximation.

The spectral region occupied by a digitized narrowband signal (both inphase and quadrature components) has a width equal to the sample rate. For example if the digitized signal has two samples per digital symbol then the spectral width of the digitized signal is twice the symbol rate. The details of how sample rate and spectral width are related are given in Lyons' book. A sub-band having a lower spectral width than the original signal may be represented by a proportionally lower sample rate digitized representation. Provided that the combination of the spectral regions associated with all the sub-bands covers the same spectral region as the original signal, perhaps with some overlapping, then the representation of the signal as multiple lower sample rate sub-bands is as valid as the single band representation of the signal. It is acceptable to apply chromatic dispersion compensation to each of the sub-bands, provided that the chromatic dispersion compensation operation applied to each sub-band is appropriate to the spectral region occupied by that sub-band.

Figure 6:
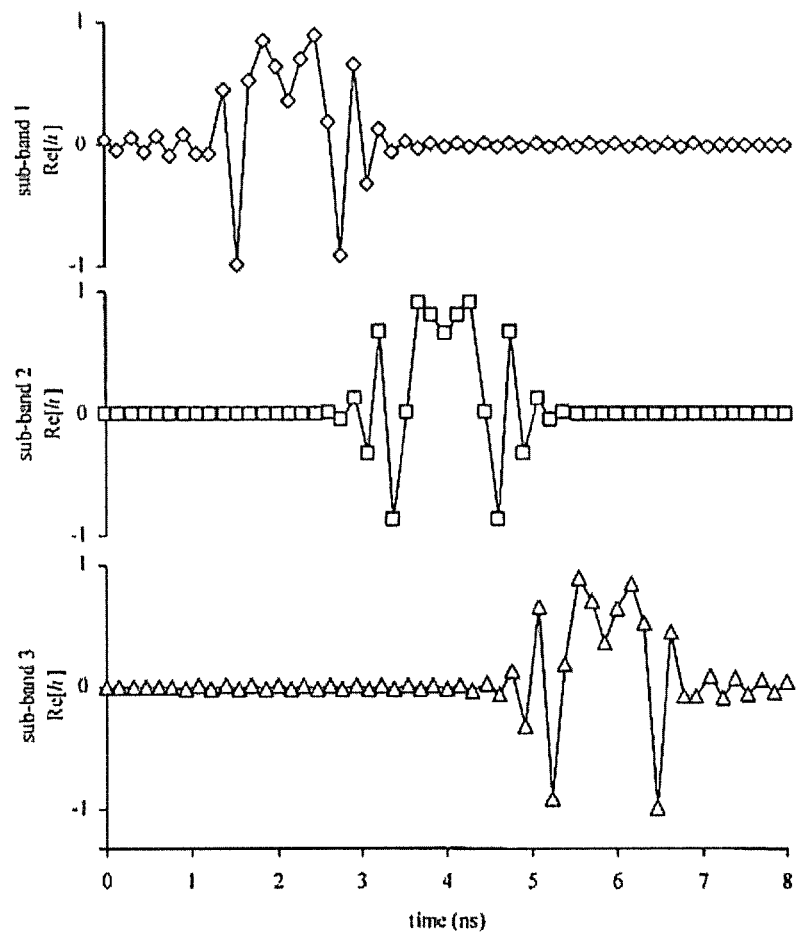
FIG. 6 is an exemplary graph illustrating the FIR filter coefficients for chromatic dispersion compensation when the signal is divided into three sub-bands and the sub-band signal representation has a three times lower sample than the original signal.

For example, a 10 Gbaud signal may be represented by a discrete-time sequence of samples separated by 50 ps. Alternatively it may be represented as three sub-band signals, each one having samples separated by 150 ps, where the three sub-bands' spectra are contiguous. The FIR filter coefficients for CD compensation of 2000 km NDSF of the single band representation were given in FIG. 2. The FIR filter coefficients for the same CD compensation of the three sub-bands are shown in FIG. 6 (only the real part is shown; the imaginary part has similar behavior). The points in FIG. 6 are spaced by 150 ps, instead of the 50 ps spacing of FIG. 2. It can be seen that each sub-band has non-zero coefficient over a small range in time; there are about 20 non-zero coefficients each in FIG. 6. This means that the number on non-zero coefficients for all three sub-bands together (60 in FIG. 6) is less than the number of coefficients for the single band (140 in FIG. 2). This property that there is a saving in the number of coefficients by dividing the FIR filter operation into sub-bands is associated with the transfer function of chromatic dispersion compensation. An arbitrarily chosen linear filter operation does not require fewer multiplication operations when organized into sub-bands. Thus, it is not the normal practice for the designer of a digital signal processor to consider executing a linear filter operation in sub-bands, because usually it delivers no benefit.

Figure 7:
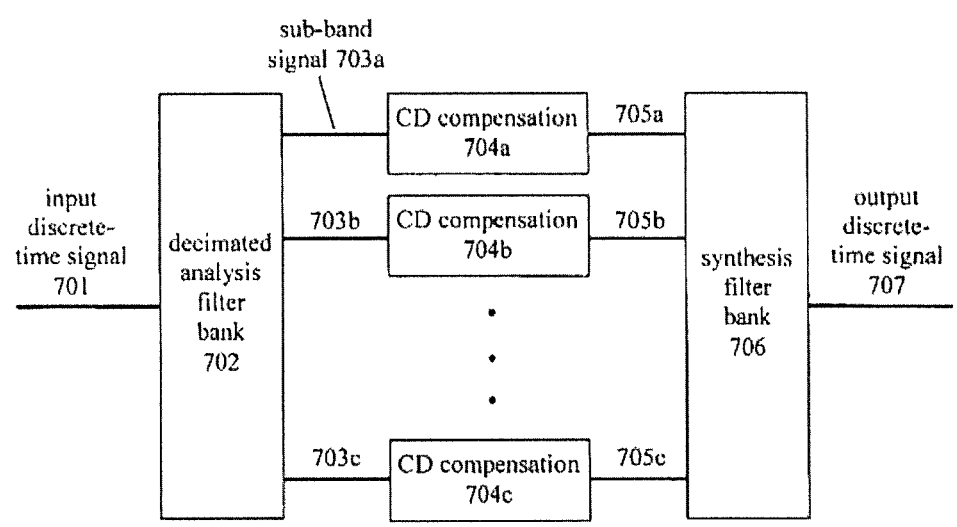
FIG. 7 is a simplified block diagram illustrating a set of digital signal processing operations to compensate for chromatic dispersion by dividing a signal into multiple sub-bands.

The digital signal processor must include operations to separate the signal into sub-bands, and then to combine the CD-compensated sub-bands into a single signal. Many methods of sub-band filtering are described in "Multirate Systems And Filter Banks" by P. P. Vaidyanathan (Prentice Hall, 1993), herein incorporated by reference. The arrangement of FIG. 7 may be used to achieve this. Each block in FIG. 7 corresponds to a digital signal processing operation that is a mathematical operation, and is performed by digital logic within an integrated circuit. The input signal 701 is separated into multiple sub-band signals 703 by a decimated analysis filter bank 702. There are several possible designs for the decimated analysis filter bank. It may be implemented as a bank of FIR filters or IIR filters, or as a cosine modulated filter bank, or as a DFT modulated filter bank. Another option is to use a tree structured filter bank. For example, a tree structure of M stages of half-band filters has $2^M$ outputs, each one having a spectrum occupying about $\frac{1}{2}^M$ of the full band.

Figure 8:
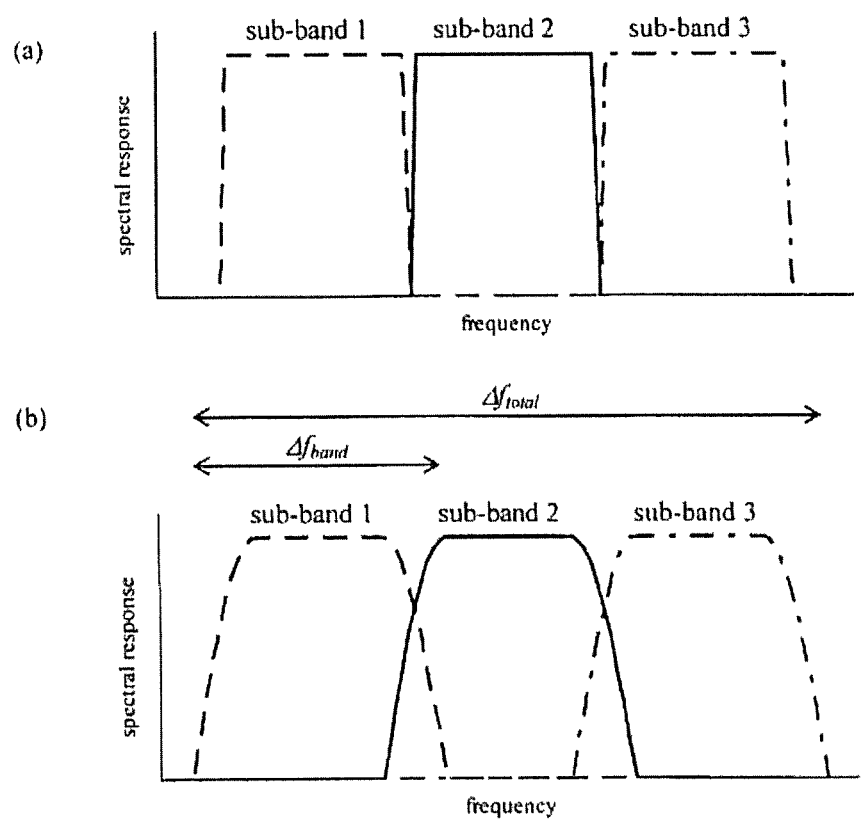
FIG. 8, (a), is a graph illustrating exemplary square non-overlapping sub-band shapes utilized when implementing sub-band processing.

There are many possible designs of sub-band spectral response. For example the sub-band analysis filters may be chosen to have square non-overlapping spectral responses, as shown in FIG. 8(a). Typically it requires a large amount of computations to obtain square edges for such a filter, and realistically the sub-band filter spectral response may have some side lobes. These features will in turn lead to a penalty in the quality of the compensated signal due to aliasing. An alternative set of sub-band analysis filter spectral responses is given in FIG. 8(b), where each response has a decaying edge and where the responses overlap. The rounded nature means that the a small amount of computations may provide an actual response close to the design target. There are two approaches to the choice of sub-band sample rate that may be taken with the overlapping sub-band spectral responses. The sample rate may be set to $\Delta f_{total}/N_{sub-bands}$ where $N_{sub-bands}$ is the number of sub-bands and $\Delta f_{total}$ is the input signal bandwidth as indicated on FIG. 8(b). This option, known as maximally decimated sub-bands, will mean that there is some aliasing, and the analysis and synthesis filter functions should be chosen to minimize the amount of aliasing. Alternatively the sub-band sample rate may be set to $\Delta f_{band}$, which is higher than $\Delta f_{total}/N_{sub-bands}$. There will then be no aliasing. It is advantageous to choose $\Delta f_{band}$ to be related to $\Delta f_{total}$ by a ratio of integers. The width of the sub-band should be chosen carefully, since when $\Delta f_{band}$ is large the savings on amount of computations for the CD compensation part is reduced, and when $\Delta f_{band}$ is too small more computations are needed to implement the analysis and synthesis filter banks.

Each sub-band is processed to compensate for chromatic dispersion by CD compensation operations 704. The use of FIR filters for CD compensation was discussed above, and the use of IIR filters is discussed below.

The output of the chromatic dispersion compensation operation is represented in several sub-bands 705, each having a sample rate lower than that of the original input signal 701. Next, these sub-band signals 705 are combined into a single output signal 707 by a synthesis filter bank 706. The output signal has a higher sample rate than the sub-band signals. It may have the same sample rate as the input signal 701, or the sample rate may be lower, for example if the output is directed to a decision operation which requires one sample per symbol instead of the two samples per symbol of the original input signal. Like the analysis filter bank, there are several possible designs for the synthesis filter bank. Often the synthesis filter bank performs the converse operation of the analysis filter bank and so has similar design.

In some system configurations it may not be necessary to combine all the sub-bands into a single output signal. It is possible that one CD compensated sub-band signal contains information to be directed to one user or to one location in the transmission system for further processing. There is no need to combine that sub-band signal with the others and then subsequently extract it from the output signal, and that sub-band signal may be forwarded to its destination directly.

The shape of the sub-band filters and the interpolation filters may be chosen so that the sum of the combined responses for the sub-bands is a flat response. The term "combined response" refers to the spectral response of the analysis filter for a particular sub-band followed by the spectral response of the corresponding synthesis filter. One way to achieve a flat spectral response for the sum of the combined sub-band responses is to set the spectral response of each sub-band filter, and the corresponding interpolation filter, to be the square root of a raised cosine function in the frequency domain.

For the sub-band processing approach to CD compensation to be of benefit it is necessary for the total amount of computations to be less than the direct FIR filter approach. The total amount of computations includes the sub-band analysis and synthesis filter banks and the CD compensation operation. It can be seen that there is a saving in the CD compensation portion, as was made clear earlier by comparing FIG. 2 and FIG. 6. It has been shown in "Compact Digital Dispersion Compensation Algorithms" by M. G. Taylor that there is a saving in the amount of computations overall using sub-band processing for CD compensation of a 25 Gbaud QPSK signal over 6400 km of NDSF.

It has been described how an FIR filter can implement the CD compensation operation. The sub-band processing approach may also be of benefit with an IIR filter for CD compensation. One of the disadvantages of the IIR filter for direct CD compensation (without sub-band processing) is that the IIR filter uses a recent result y(n−1) to calculate y(n), and y(n−1) is not available because of the slow clock speed of the digital signal processor. However, the CD compensation elements within the sub-band processing configuration of FIG. 7 operate on a discrete-time sequence of a lower sample rate. This means that the restriction of unavailable y(n−1) may not occur. If it does occur then the solution to recast the algorithm using a look-ahead computation may not give rise to a punitive increase in the amount of computations. Thus, the combination of sub-band processing with IIR filtering for CD compensation may lead to a substantial reduction in the overall amount of computations, while the use of IIR filtering alone does not.

The present invention may of course, be carried out in other specific ways than those herein set forth without departing from the essential characteristics of the invention. The present embodiments are, therefore, to be considered in all respects as illustrative and not restrictive and all changes coming within the meaning and equivalency range of the appended claims are intended to be embraced therein.

What is claimed is:

1. A digital signal processor utilized in a fiber optic communication system, the digital signal processor comprising:
   at least one integrated circuit coupled to at least one memory, the at least one integrated circuit configured to:
      compensate for chromatic dispersion of the fiber optic communication by executing a digital filter function, wherein the digital filter function includes an operation of multiplying a signal value received by the digital signal processor by a filter coefficient that is approximated to a circular plot on a complex plane of coefficients to produce a multiplication result that recurs at least three times to be usable at least three different times during the execution of the digital filter function to compensate for the chromatic dispersion.

2. The digital signal processor of claim 1, wherein the digital filter function is a finite impulse response (FIR) filter function.

3. The digital signal processor of claim 2, wherein:
   the multiplication result is stored in a look-up table in the at least one memory when the operation of multiplying is executed; and
   the multiplication result is drawn from the look-up table to be used for the at least three different times in the FIR filter function.

4. The digital signal processor of claim 2, wherein the multiplication result is fanned out to one or more locations in the digital signal processor to be used for different terms in the FIR filter function.

5. The digital signal processor of claim 1, wherein a frequency response associated with the digital filter function is substantially similar to an apodized version of a chromatic dispersion transfer function to compensate for the chromatic dispersion.

6. A method of compensating for chromatic dispersion experienced by an optical signal propagating through a fiber optic transmission system, said method acting on a discrete-time representation of the optical signal with a digital filter operation, the method comprising:
   performing by at least one integrated circuit implementing the digital filter operation:
      multiplying a signal value received for the digital filter operation by a filter coefficient that is approximated to a circular plot on a complex plane of coefficients to obtain a multiplication result that recurs at least three times to be usable as at least three different multiplication terms during execution of the digital filter function to perform compensation for chromatic dispersion; and
      using the multiplication result as a value of the at least three different multiplication terms in the digital filter operation for the compensation for chromatic dispersion.

7. The method of claim 6, wherein the using the multiplication result as the value of the at least three different multiplication terms in the digital filter operation further comprises:
   writing the multiplication result to a look-up table in at least one memory coupled to the at least one integrated circuit; and
   retrieving the multiplication result from the look-up table to be used as the value of the at least three different multiplication terms in the digital filter operation.

8. The method of claim 6, further comprising:
   calculating an inverse Fourier transform of an apodized version of a chromatic dispersion transfer function for the compensation for the chromatic dispersion; and
   to approximate the filter coefficient, setting feedforward digital filter coefficients to be approximately equal to the inverse Fourier transform values.

\* \* \* \* \*